(12) United States Patent
Futakuchi et al.

(10) Patent No.: US 9,132,714 B2
(45) Date of Patent: Sep. 15, 2015

(54) CAPACITY CONTROL VALVE

(75) Inventors: Masayuki Futakuchi, Tokyo (JP); Kohei Fukudome, Tokyo (JP); Kenji Moriwaki, Tokyo (JP); Masahiro Hayama, Tokyo (JP); Toshinori Kanzaki, Tokyo (JP); Ryosuke Cho, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 31 days.

(21) Appl. No.: 13/816,626

(22) PCT Filed: Nov. 4, 2011

(86) PCT No.: PCT/JP2011/075460
§ 371 (c)(1),
(2), (4) Date: Feb. 12, 2013

(87) PCT Pub. No.: WO2012/077439
PCT Pub. Date: Jun. 14, 2012

(65) Prior Publication Data
US 2013/0291963 A1    Nov. 7, 2013

(30) Foreign Application Priority Data

Dec. 9, 2010    (JP) ................. 2010-274162

(51) Int. Cl.
*F04B 1/26* (2006.01)
*B60H 1/00* (2006.01)
*F04B 27/18* (2006.01)

(52) U.S. Cl.
CPC ........ *B60H 1/00485* (2013.01); *F04B 27/1804* (2013.01); *F04B 2027/1827* (2013.01); *F04B 2027/1831* (2013.01); *Y10T 137/7761* (2015.04)

(58) Field of Classification Search
CPC ............ B60H 1/00485; F04B 27/1804; F04B 2027/1831; F04B 2027/1827
USPC .................... 417/222.2; 251/129.02
See application file for complete search history.

(56) References Cited

U.S. PATENT DOCUMENTS 6,361,283 B1 * 3/2002 Ota et al. ............... 417/222.2
6,398,516 B1 * 6/2002 Kawaguchi et al. ....... 417/222.2

(Continued)

FOREIGN PATENT DOCUMENTS

| CN | 1763369 | 4/2006 | ............ F04B 27/14 |
| CN | 101124405 | 2/2008 | ............ F04B 27/18 |

(Continued)

OTHER PUBLICATIONS

International Preliminary Report on Patentability and Written Opinion issued in corresponding application No. PCT/JP2011/075460, dated Jun. 12, 2013 (6 pgs).
International Search Report issued in corresponding application No. PCT/JP2011/075460, dated Jan. 31, 2012 (3 pgs).
Chinese Office Action issued in application No. 201180057901.9, dated Dec. 22, 2014 (9 pgs).

*Primary Examiner* — Marina Tietjen
*Assistant Examiner* — Umashankar Venkatesan
(74) *Attorney, Agent, or Firm* — Hayes Soloway P.C.

(57) ABSTRACT

A capacity control valve for increasing the ability to drain liquid refrigerant from a control chamber during startup of a variable-capacity compressor without changing the control valve characteristics has a spring acting in the direction of valve opening provided between an adapter and a free end of a pressure-sensitive body in the extension and contraction direction thereof and having an annular seat surface, and a third valve part having an annular engaging surface for opening and closing a suction-side passage by engaging and disengaging with the seat surface of the adapter.

6 Claims, 10 Drawing Sheets

(56) References Cited

U.S. PATENT DOCUMENTS

| | | | |
|---|---|---|---|
| 6,772,990 B2 * | 8/2004 | Sasaki et al. | 251/129.03 |
| 6,939,112 B2 * | 9/2005 | Taguchi | 417/222.2 |
| 8,021,124 B2 | 9/2011 | Umemura et al. | 417/222.2 |
| 2003/0145615 A1 | 8/2003 | Sasaki et al. | 62/228.3 |
| 2005/0053474 A1 * | 3/2005 | Hirota et al. | 417/222.2 |
| 2005/0214133 A1 * | 9/2005 | Taguchi | 417/222.2 |
| 2006/0086918 A1 | 4/2006 | Koyama | 251/129.01 |
| 2006/0228227 A1 * | 10/2006 | Mori et al. | 417/222.2 |
| 2008/0138213 A1 | 6/2008 | Umemura et al. | 417/222.2 |
| 2009/0183786 A1 | 7/2009 | Iwa et al. | 137/487.5 |
| 2012/0198992 A1 | 8/2012 | Futakuchi et al. | 91/505 |

FOREIGN PATENT DOCUMENTS

| | | | | |
|---|---|---|---|---|
| JP | 2003278650 | | 10/2003 | F04B 27/14 |
| JP | 2003322086 | | 11/2003 | F04B 49/00 |
| WO | WO2006090760 | | 8/2006 | F04B 27/18 |
| WO | WO2007119380 | | 10/2007 | F04B 27/14 |
| WO | WO2011114841 | | 9/2011 | F04B 27/14 |

* cited by examiner

Prior Art

D: SEAL DIAMETER OF THIRD VALVE PART
θ : TAPER ANGLE OF VALVE SEAT
r: SPHERE RADIUS OF THIRD VALVE PART
st: STROKE OF THIRD VALVE PART

Prior Art

| A: | BELLOWS EFFECTIVE AREA |
|---|---|
| B: | SEAL AREA OF THIRD VALVE PART |
| Fb: | BELLOWS SPRING FORCE |
| Pc: | CONTROL CHAMBER PRESSURE |
| Ps: | SUCTION PRESSURE |

Prior Art

- A: BELLOWS EFFECTIVE AREA
- B: SEAL AREA OF THIRD VALVE PART
- Fb: BELLOWS SPRING FORCE
- Pc: CONTROL CHAMBER PRESSURE
- Ps: SUCTION PRESSURE
- k: BELLOWS SPRING CONSTANT
- st: STROKE

Prior Art

Prior Art

CAPACITY CONTROL VALVE

TECHNICAL FIELD

The present invention relates to a capacity control valve for variably controlling the capacity or pressure of a working fluid, and relates particularly to a capacity control valve for controlling the discharge amount of a variable-capacity compressor or the like used in an air conditioning system of an automobile or the like.

BACKGROUND ART

A swash plate variable-capacity compressor used in an air conditioning system of an automobile or the like is provided with a rotating shaft driven by the rotational power of an engine, a swash plate connected so that the inclination angle thereof with respect to the rotating shaft is variable, a compression piston connected to the swash plate, and other components, and by varying the stroke of the piston by varying the inclination angle of the swash plate, the discharge amount of refrigerant gas is controlled.

The inclination angle of the swash plate can be continuously varied by appropriately controlling the pressure in a control chamber through use of a capacity control valve opened and closed by electromagnetic force to adjust the balance of pressure acting on both sides of the piston, while utilizing the suction pressure of a suction chamber for drawing in refrigerant gas, the discharge pressure of a discharge chamber for discharging refrigerant gas that is pressurized by the piston, and the control chamber pressure of a control chamber (crankcase) which houses the swash plate.

FIG. 6 shows an example of such a capacity control valve (referred to hereinafter as "Prior Art 1;" see Patent Document 1, for example) provided with discharge-side passages 73, 77 for communicating a discharge chamber and a control chamber; a first valve chamber 82 formed partway in the discharge-side passages; suction-side passages 71, 72 for communicating a suction chamber and the control chamber; a second valve chamber (working chamber) 83 formed partway in the suction-side passages; a valve body 81 formed so that a first valve part 76 disposed in the first valve chamber 82 to open and close the discharge-side passages 73, 77 and a second valve part 75 disposed in the second valve chamber 83 to open and close the suction-side passages 71, 71 integrally reciprocate while alternately opening and closing with respect to each other; a third valve chamber (capacity chamber) 84 formed partway in the suction-side passages 71, 72 closer to the control chamber; a pressure-sensitive body (bellows) 78 for exerting an urging force in the direction of extension (expansion) and contracting in conjunction with an increase in the surrounding pressure, the pressure-sensitive body being disposed in the third valve chamber; a valve seat (engaging part) 80 provided to a free end of the pressure-sensitive body in the extension and contraction direction thereof and having an annular seat surface; a third valve part (valve opening connection) 79 which moves integrally with the valve body 81 in the third valve chamber 84 and can open and close the suction-side passages by engagement and disengagement with the valve seat 80; a solenoid for exerting an electromagnetic driving force on the valve body 81; and other components.

This capacity control valve 70 is configured so that when the need arises to change the control chamber pressure during capacity control, the discharge chamber and the control chamber can be communicated and the pressure (control chamber pressure) Pc in the control chamber adjusted despite the variable-capacity compressor not being provided with a clutch mechanism. In this configuration, in a case in which the control chamber pressure Pc is elevated while the variable-capacity compressor is stopped, the third valve part (valve opening connection) 79 is disengaged from the valve seat (engaging part) 80 to open the suction-side passages and communicate the suction chamber and the control chamber.

In a case in which the swash plate variable-capacity compressor is started after having been stopped and left inactive for a long period of time, since liquid refrigerant (formed by condensation of refrigerant gas cooled during inactivity) accumulates in the control chamber (crankcase), refrigerant gas cannot be compressed and the set discharge amount maintained unless the liquid refrigerant is drained.

The liquid refrigerant in the control chamber (crankcase) must be drained as soon as possible in order to perform the desired capacity control immediately after starting.

In the capacity control valve 70 of Prior Art 1, when the solenoid S is turned off and the variable-capacity compressor is left stopped for a long time with the second valve part 75 blocking the communicating passages (suction-side passages) 71, 72, a state occurs in which liquid refrigerant is accumulated in the control chamber (crankcase) of the variable-capacity compressor. When the variable-capacity compressor is stopped for a long time, the pressure becomes uniform inside the variable-capacity compressor, and the control chamber pressure Pc becomes significantly higher than the suction pressure Ps and the control chamber pressure Pc that occurs during driving of the variable-capacity compressor.

In this state, when the solenoid S is turned on and the valve body 81 begins to move, the second valve part 75 moves in the opening direction at the same time that the first valve part 76 moves in the closing direction, and the liquid refrigerant in the control chamber of the variable-capacity compressor is drained. The control chamber pressure Pc causes the pressure-sensitive body 78 to contract, the third valve part 79 is disengaged from the valve seat 80, and the valve is opened. At that time, the second valve part 75 opens to open the communicating passages (suction-side passages) 72, 71, and the liquid refrigerant in the control chamber is therefore drained from the communicating passages (suction-side passages) 74, 72, 71 to the suction chamber of the variable-capacity compressor. When the control chamber pressure Pc reaches a predetermined level or below, the pressure-sensitive body 78 extends by elastic return, the valve seat 80 engages with the third valve part 79 to close the valve, and the communicating passages (suction-side passages) 74, 72, 71 are blocked.

FIG. 7 is a view showing the factors that determine the flow passage area of the third valve part 79 in FIG. 6, and shows a state in which the view of FIG. 6 is rotated 90° clockwise.

As shown in FIG. 7, the factors determining the flow passage area of the third valve part 79 in Prior Art 1 are the seal diameter D of the third valve part, the taper angle θ of the valve seat, the sphere radius r of the third valve part, and the stroke st of the third valve part.

Therefore, first examining the seal diameter D of the third valve part with reference to FIG. 8, the equilibrium of forces on the third valve part 79 is as expressed below in the case that the bellows effective area A and the seal area B of the third seal part are such that A>B.

$$(A-B)Pc + BPs - Fb = 0 \rightarrow Pc = (Fb - BPs)/(A-B)$$

Since the third valve part 79 opens and control becomes impossible when the control chamber pressure Pc is equal to or higher than shown above, the bellows effective diameter and the seal diameter D of the third valve part 79 must be set so as to be the same in order to eliminate dependence on the control chamber pressure Pc. The seal diameter D ultimately cannot be changed, due to the limitation placed thereon by the bellows effective diameter.

Next examining the stroke st of the third valve part 79 with reference to FIG. 9, the equilibrium of forces when the third valve part 79 is stroked is such that when A=B, since $$k \cdot st = (A-B)Pc + BPs - Fb, \text{ then}$$

$$st = (BPs - Fb)/k.$$

The spring force Fb in this equation is expressed below.

$$Fb = (A-C)Pc + Cps + (Fsol - Fspr1)$$

C: Seal area of the first valve part 76
Fsol: Solenoid thrust
Fspr1: Valve-opening spring force of a coil spring installed in the solenoid Since the spring force Fb of the bellows is determined by the control chamber pressure Pc, the suction chamber pressure Ps, and the solenoid characteristics, it has been considered impossible to change the stroke st of the third valve part 79 without changing the control valve characteristics above.

For these reasons, conventional efforts to improve the flow passage area of the third valve part 79 have been concentrated entirely on optimizing the radius r of the third valve part 79 and the taper angle θ of the valve seat 80, and although these improvements make it possible to drain the liquid refrigerant faster than in a conventional capacity control valve (capacity control valve in which draining is accomplished solely through a fixed orifice for directly communicating the control chamber and the suction chamber) not structure so that the third valve part 79 can be opened, the ability to drain the liquid refrigerant is limited.

A technique has therefore been proposed by the present applicant in which an auxiliary communicating passage 85 is provided in a side surface of the third valve part 79, as shown in FIG. 10 (referred to hereinafter as "Prior Art 2;" see Patent Document 2, for example).

The technique of Prior Art 2 is capable of accelerating drainage of the liquid refrigerant, but during operation, the control chamber (crankcase) and the suction chamber are always communicated. A flow from the control chamber (crankcase) to the suction chamber therefore occurs, which adversely affects the swash plate control speed during control of the variable-capacity compressor.

PRIOR ART DOCUMENTS

Patent Documents

Patent Document 1: WO Publication No. 2006/090760 pamphlet
Patent Document 2: WO Publication No. 2007/119380 pamphlet

DISCLOSURE OF THE INVENTION

Problems to be Solved by the Invention

The present invention was developed to solve the problems of Prior Art 1 and Prior Art 2 described above, and an object of the present invention is to provide a capacity control valve capable of enhancing the swash plate control speed during normal control (between maximum-capacity operation and minimum-capacity operation) and minimum-capacity operation and of increasing the ability to drain the liquid refrigerant of the control chamber during startup of the variable-capacity compressor, without changing the control valve characteristics of the capacity control valve.

Means for Solving the Problems

The capacity control valve according to a first aspect of the present invention for achieving the abovementioned objects is characterized in comprising:
a discharge-side passage for communicating a discharge chamber for discharging a fluid and a control chamber for controlling an amount of fluid discharged;
a first valve chamber formed partway in the discharge-side passage;
a suction-side passage for communicating the control chamber and a suction chamber for taking in the fluid;
a second valve chamber formed partway in the suction-side passage;
a valve body integrally having a first valve part for opening and closing the discharge-side passage in the first valve chamber and a second valve part for opening and closing the suction-side passage in the second valve chamber, the first valve part and second valve part alternately opening and closing with respect to each other by reciprocating;
a third valve chamber formed partway in the suction-side passage closer to the control chamber than the second valve chamber;
a pressure-sensitive body for exerting an urging force in the direction of opening the first valve part by extension of the pressure-sensitive body and contracting in conjunction with an increase in the surrounding pressure, the pressure-sensitive body being disposed in the third valve chamber;
an adapter provided to a free end of the pressure-sensitive body in the extension and contraction direction thereof and having an annular seat surface;
a third valve part having an annular engaging surface for moving integrally with the valve body in the third valve chamber and opening and closing the suction-side passage by engaging and disengaging with the seat surface of the adapter; and
a solenoid for exerting an electromagnetic driving force on the valve body in the direction of closing of the first valve part.
urging means being provided for acting in the valve-opening direction between the adapter and the third valve part.

Through the first aspect, a capacity control valve can be provided in which the open area between the adapter and the third valve part can be increased and the valve-open state can be maintained until the suction pressure decreases further, the ability to drain the liquid refrigerant of the control chamber during starting of a variable-capacity compressor can be increased, and the swash plate control speed can be enhanced during normal control (between maximum-capacity operation and minimum-capacity operation) and minimum-capacity operation, without changing the control valve characteristics of the capacity control valve.

The capacity control valve according to a second aspect of the present invention is the capacity control valve according to the first aspect, characterized in that the urging means comprises a coil spring.

By the second aspect, the manufacture and urging-force setting of the urging means are facilitated, and the flow of liquid refrigerant is not inhibited by increasing the pitch of the coil.

The capacity control valve according to a third aspect of the present invention is the capacity control valve according to the first or second aspect, characterized in that the urging means is disposed on an internal peripheral side of the adapter.

By the third aspect, the space inside the adapter can be efficiently utilized, and the adapter and the third valve part can be compactly formed.

The capacity control valve according to a fourth aspect of the present invention is the capacity control valve according to the first or second aspect, characterized in that the urging means is disposed on an external peripheral side of the adapter.

By the fourth aspect, the urging means can be easily attached and replaced.

Effect of the Invention

The present invention has advantageous effects such as those described below.

(1) Providing an urging means for urging in the valve-opening direction between the adapter and the third valve part makes it possible to provide a capacity control valve in which the open area between the adapter and the third valve part can be increased and the valve-open state can be maintained until the suction pressure decreases further, the ability to drain the liquid refrigerant of the control chamber during starting of a variable-capacity compressor can be increased, and the swash plate control speed can be enhanced during normal control (between maximum-capacity operation and minimum-capacity operation) and minimum-capacity operation, without changing the control valve characteristics of the capacity control valve.

(2) Through a configuration in which the urging means is formed from a coil spring, the manufacture and urging-force setting of the urging means are facilitated, and the flow of liquid refrigerant is not inhibited by increasing the pitch of the coil.

(3) Through a configuration in which the urging means is disposed on an internal peripheral side of the adapter, the space inside the adapter can be efficiently utilized, and the adapter and the third valve part can be compactly formed.

(4) Through a configuration in which the urging means is disposed on an external peripheral side of the adapter, the urging means can be easily attached and replaced.

BEST MODE FOR CARRYING OUT THE INVENTION

Embodiments of the capacity control valve according to the present invention will be described in detail with reference to the accompanying drawings. However, these embodiments shall not be interpreted as limiting the present invention, and various modifications, revisions, and improvements based on the knowledge of one skilled in the art can be made within the intended scope of the present invention.

First Embodiment

Figure 1:
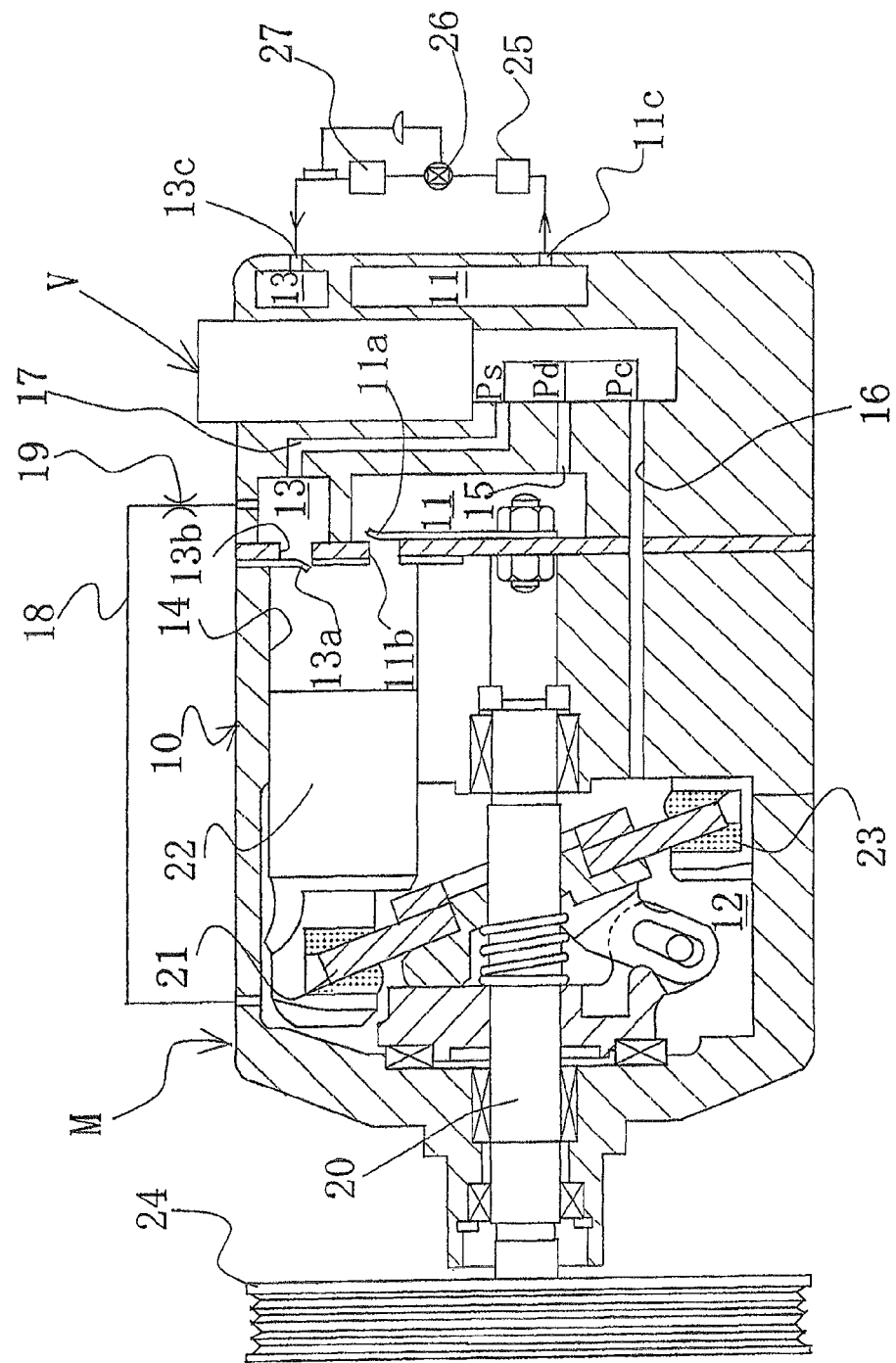
FIG. 1 is a view showing the general configuration of a swash plate variable-capacity compressor provided with the capacity control valve of the present invention.

As shown in FIG. 1, a swash plate variable-capacity compressor M is provided with a discharge chamber 11, a control chamber (also referred to as a crankcase) 12, a suction chamber 13, a plurality of cylinders 14, a port 11b communicating the cylinders 14 and the discharge chamber 11 and opened and closed by a discharge valve 11a, a port 13b communicating the cylinders 14 and the suction chamber 13 and opened and closed by a suction valve 13a, a discharge port 11c and suction port 13c connected to an external refrigerant circuit, a communicating passage 15 as a discharge-side passage for communicating the discharge chamber 11 and the control chamber 12, a communicating passage 16 which serves both as the aforementioned discharge-side passage and as a suction-side passage for communicating the control chamber 12 and the suction chamber 13, a casing 10 for demarcating a communicating passage 17 as a suction-side passage and other components, a rotating shaft 20 protruding outward from inside the control chamber (crankcase) 12 and provided so as to be able to rotate, a swash plate 21 connected so as to be able to rotate integrally with the rotating shaft 20 and have a variable inclination angle with respect to the rotating shaft 20, a plurality of pistons 22 fitted in the cylinders 14 so as to be able to reciprocate, a plurality of connecting members 23 for connecting the pistons 22 to the swash plate 21, a driven pulley 24 attached to the rotating shaft 20, the capacity control valve V of the present invention built into the casing 10, and other components.

The swash plate variable-capacity compressor M is also provided with a communicating passage 18 for directly communicating the control chamber (crankcase) 12 and the suction chamber 13, and a fixed orifice 19 is provided to the communicating passage 18.

A refrigerant circuit is also connected to the discharge port 11c and suction port 13c in the swash plate variable-capacity compressor M, and a condenser 25, an expansion valve 26, and an evaporator 27 are arranged in this order in the refrigerant circuit.

Figure 2:
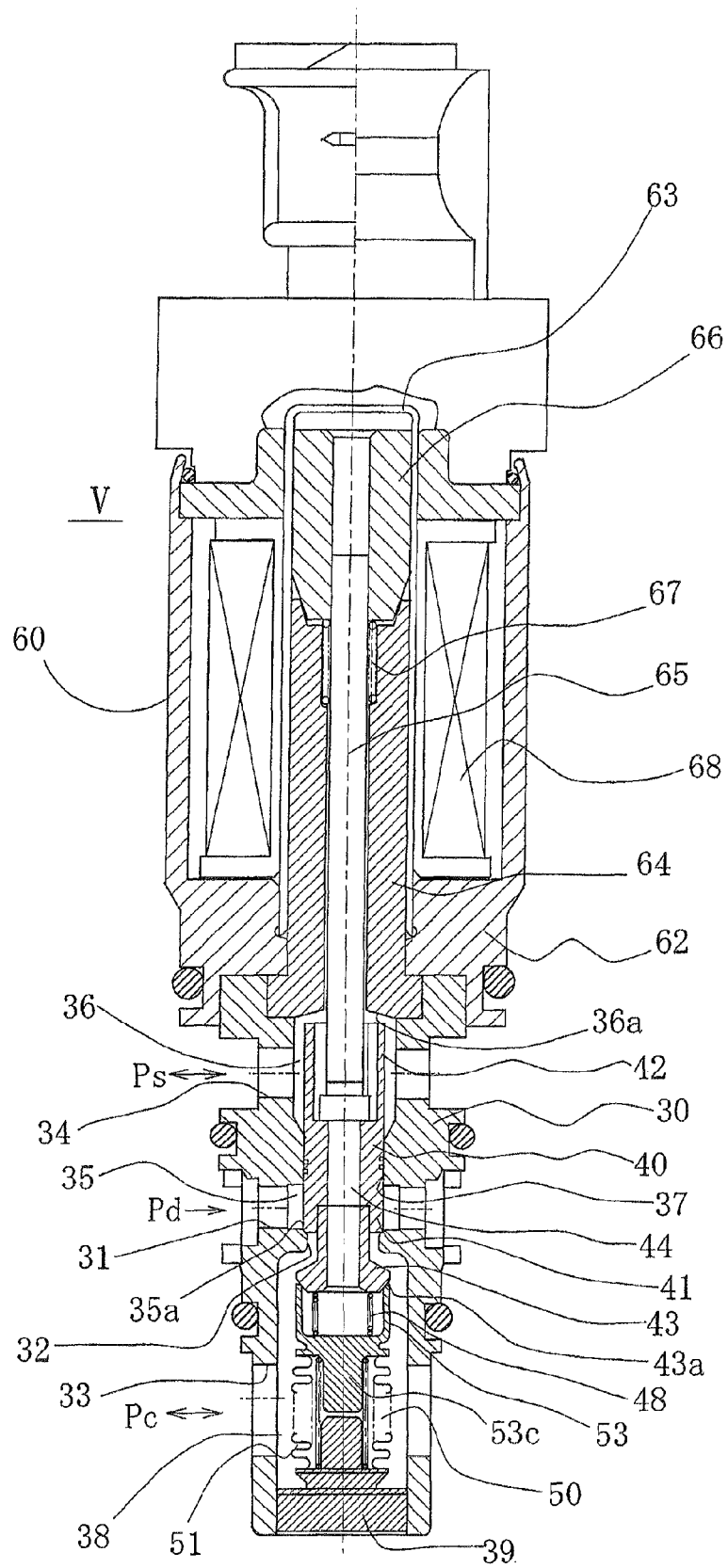
FIG. 2 is a sectional front view showing a first embodiment of the capacity control valve of the present invention.

As shown in FIG. 2, the capacity control valve V is provided with a body 30 formed of a metal material or resin material; a valve body 40 disposed in the body 30 so as to be able to reciprocate; a pressure-sensitive body 50 for urging the valve body 40 in one direction; a solenoid 60 for exerting an electromagnetic driving force on the valve body 40, the solenoid 60 being connected to the body 30; and other components.

The solenoid 60 is provided with a casing 62 connected to the body 30; a sleeve 63, one end of which is closed; a cylindrical fixed iron core 64 disposed inside the casing 62 and sleeve 63; a driving rod 65 forming a communicating passage 44, a distal end of the driving rod 65 being connected to the valve body 40, and the driving rod 65 being able to reciprocate inside the fixed iron core 64; a movable iron core 66 attached to the other end of the driving rod 65; a coil spring 67 for urging the movable iron core 66 in the direction of opening a first valve part 41; an excitation coil 68 coiled on the outside of the sleeve 63 via a bobbin; and other components.

The body 30 is provided with communicating passages 31, 32, 33 which function as discharge-side passages, communicating passages 33, 34 which function as suction-side passages together with the communicating passage 44 of the valve body 40 described hereinafter, a first valve chamber 35 formed partway in a discharge-side passage, a second valve chamber 36 formed partway in a suction-side passage, a guide passage 37 for guiding the valve body 40, a third valve chamber 38 formed close to the control chamber 12 in the discharge-side passage and suction-side passage, and other components. A blocking member 39 demarcating the third valve chamber 38 and constituting a portion of the body 30 is screwed into and attached to the body 30.

Specifically, the communicating passage 33 and the third valve chamber 38 are formed so as to serve as a portion of both a discharge-side passage and a suction-side passage, and the communicating passage 32 communicates the first valve chamber 35 and the third valve chamber 38 and forms a valve hole through the valve body 40 (passing through the valve body 40 while maintaining a gap for fluid flow). A plurality (e.g., four spaced 90 degrees apart) of each of the communicating passages 31, 33, 34 is formed in the peripheral direction and radially arranged.

A seat surface 35$a$, on which is seated the first valve part 41 of the valve body 40 described hereinafter, is formed at an edge of the communicating passage (valve hole) 32 in the first valve chamber 35, and a seat surface 36$a$, on which is seated a second valve part 42 of the valve body 40 described hereinafter, is formed at an end of the fixed iron core 64 described hereinafter in the second valve chamber 36.

The valve body 40 is formed in a substantially cylindrical shape and provided with the first valve part 41 at one end thereof and with the second valve part 42 at the other end thereof, a third valve part 43 connected by retrofitting to the opposite side of the valve body 40 from the second valve part 42 so as to sandwich the first valve part 41, a communicating passage 44 penetrating from the second valve part 42 to the third valve part 43 in the axial direction and functioning as a suction-side passage, and other components.

The third valve part 43 passes through the communicating passage (valve hole) 32 and is formed so as to broaden toward the end from a small-diameter state from the first valve chamber 35 to the third valve chamber 38, and an annular engaging surface 43$a$ which faces an adapter 53 described hereinafter is provided to an external peripheral edge of the third valve part 43 (see also FIG. 3).

Figure 3:
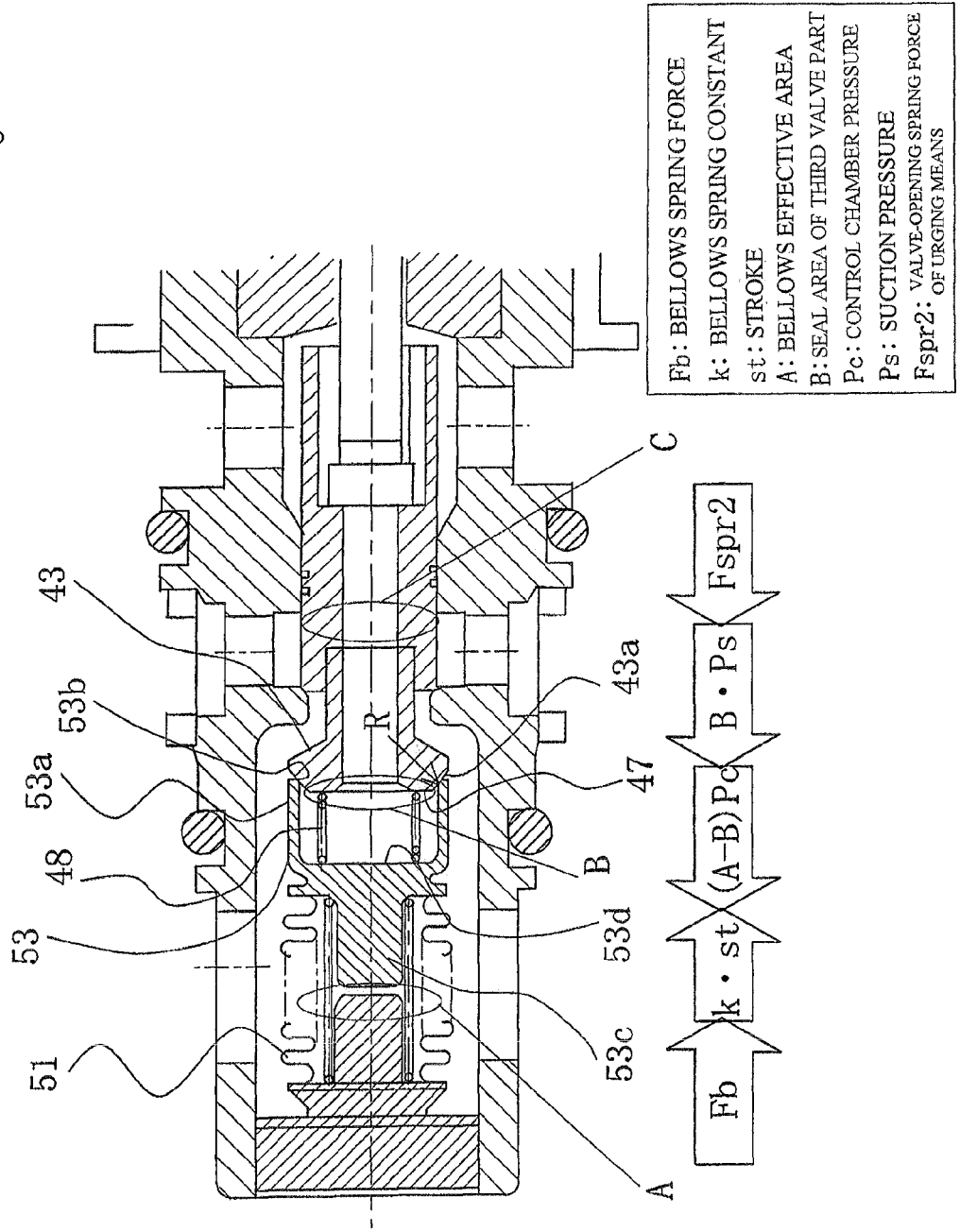
FIG. 3 is a sectional enlarged view showing the relevant parts of the capacity control valve of the first embodiment, rotated 90° clockwise, and describes the equilibrium of forces when the third valve part is stroked.

As shown in FIG. 3, the engaging surface 43$a$ of the third valve part 43 for engaging with the adapter 53 is formed as an outwardly concave spherical surface having a curvature radius R, and an end surface 47 as the installation surface for an urging means 48 described hereinafter is formed having a flat shape.

In FIG. 2, the pressure-sensitive body 50 is provided with a bellows 51, the adapter 53, and other components. One end of the bellows 51 is fixed to the blocking member 39, and the adapter 53 is held at the other end (the free end) thereof.

As shown in FIG. 3, the adapter 53 has a hollow cylindrical part 53$a$ substantially bracket-shaped in cross-section, a distal end of which engages with the third valve part 43, and a swelling part 53$c$ which swells inside the bellows 51, and an annular seat surface 53$b$ which engages and disengages with the opposing engaging surface 43$a$ of the third valve part 43 is provided at a distal end of the hollow cylindrical part 53$a$. The seat surface 53$b$ of the hollow cylindrical part 53$a$ is formed as a tapered surface. A basal inside surface 53$d$ of the hollow cylindrical part 53$a$ is substantially flat.

The pressure-sensitive body 50 is disposed inside the third valve chamber 38, and operates so as to exert an urging force in the direction of closing the first valve part 41 when extended (expanded), and to contract in conjunction with a pressure increase on the periphery thereof (in the third valve chamber 38 and the communicating passage 44 of the valve body 40) such that the urging force on the first valve part 41 is reduced.

FIG. 3 is a sectional enlarged view showing the relevant parts of the capacity control valve of the first embodiment, and describes the equilibrium of forces when the third valve part is stroked.

The urging means 48 operating in the direction of opening the third valve part 43 and the adapter 53 is provided between the end surface 47 of the third valve part 43 and the basal inside surface 53$d$ of the hollow cylindrical part 53$a$ of the adapter 53. The urging means 48 is composed of a coil spring or other spring means, and a plurality thereof is arranged at equal intervals in the circumferential direction. In this case, since the coil spring is positioned in the path of drainage of liquid refrigerant, the pitch of the coil is preferably set to a large value.

The equation below describes the equilibrium of forces when the third valve part 43 is stroked, where st is the displacement of the stroke, and k is the spring constant of the bellows 51.

$$k \cdot st = (A-B)Pc + BPs + Fspr2 - Fb$$

A: bellows effective area
B: seal area of the third valve part
Pc: control chamber pressure
Ps: suction pressure
Fspr2: valve-opening spring force of the urging means
Fb: bellows spring force In the case that A=B, then st=(BPs+Fspr2−Fb)/k, and the stroke st of the third valve part 43 when Ps is the same increases relative to a case in which the urging means 48 is not provided. Specifically, the open area of the third valve part can be increased by an amount equal to the difference made by providing the urging means 48.

The equations below describe the spring force Fb of the bellows 51.

$$Fb - (A-C)Pc - CPs - (Fsol - Fspr1) - Fspr2 + Fspr2 = 0$$

$$Fb = (A-C)Pc + CPs + (Fsol - Fspr1)$$

C: seal area of the first valve part 41
Fsol: solenoid thrust
Fspr1: valve-opening spring force of the coil spring installed in the solenoid It has been confirmed that providing the urging means 48 to the third valve part 43 does not change the spring force of the bellows 51. Specifically, the fact that the Pc, Ps, and other control characteristics or the Fsol−Fspr1 solenoid characteristics are unaffected by providing the urging means 48 to the third valve part 43 revolutionizes the conventional thinking that the stroke st of the third valve part 79 cannot be changed without changing the control valve characteristics and solenoid characteristics.

In the configuration described above, when the coil 68 is unpowered, the urging force of the pressure-sensitive body 50 and the coil spring 67 causes the valve body 40 to move toward the top in FIG. 2, and the first valve part 41 separates from the seat surface 35a to open the communicating passages (discharge-side passages) 31, 32, whereupon the second valve part 42 is seated on the seat surface 36a to block the communicating passages (suction-side passages) 34, 44.

When the variable-capacity compressor is left stopped for a long time in the state in which the communicating passages (suction-side passages) 34, 44 are blocked, a state occurs in which liquid refrigerant is accumulated in the control chamber (crankcase) 12 of the variable-capacity compressor, the pressure becomes uniform inside the variable-capacity compressor, and the control chamber pressure Pc becomes significantly higher than the suction pressure Ps and the control chamber pressure Pc that occurs during driving of the variable-capacity compressor.

When the coil 68 is supplied with current at a predetermined current value (I) or greater, the electromagnetic driving force (urging force) of the solenoid 60 acting in the opposite direction from the urging force of the pressure-sensitive body 50 and the coil spring 67 causes the valve body 40 to move toward the bottom in FIG. 2, and the first valve part 41 is seated on the seat surface 35a to block the communicating passages (discharge-side passages) 31, 32, whereupon the second valve part 42 separates from the 36a and opens the communicating passages (suction-side passages) 34, 44. The liquid refrigerant in the control chamber is drained immediately after this startup process, but because the control chamber pressure Pc is at or above a predetermined level, the bellows 51 contracts, the adapter 53 disengages from the third valve part 43, and the suction-side passages (33, 44, 34) are placed in the open state. The liquid refrigerant or the like accumulated in the control chamber 12 is drained to the suction chamber 13 through the communicating passages (suction-side passages) 33, 44, 34. At this time, the size of the drainage passage for the liquid refrigerant or the like is equal to the sum of the open area s1 of the fixed orifice 19 and the open area s2 between the engaging surface 43a of the third valve part 43 and the seat surface 53b of the adapter 53, but because the open area s2 is larger than that of Prior Art 1 by the amount obtained through the valve-opening force of the urging means 48, an adequately large drainage passage area can be maintained.

Figure 4:
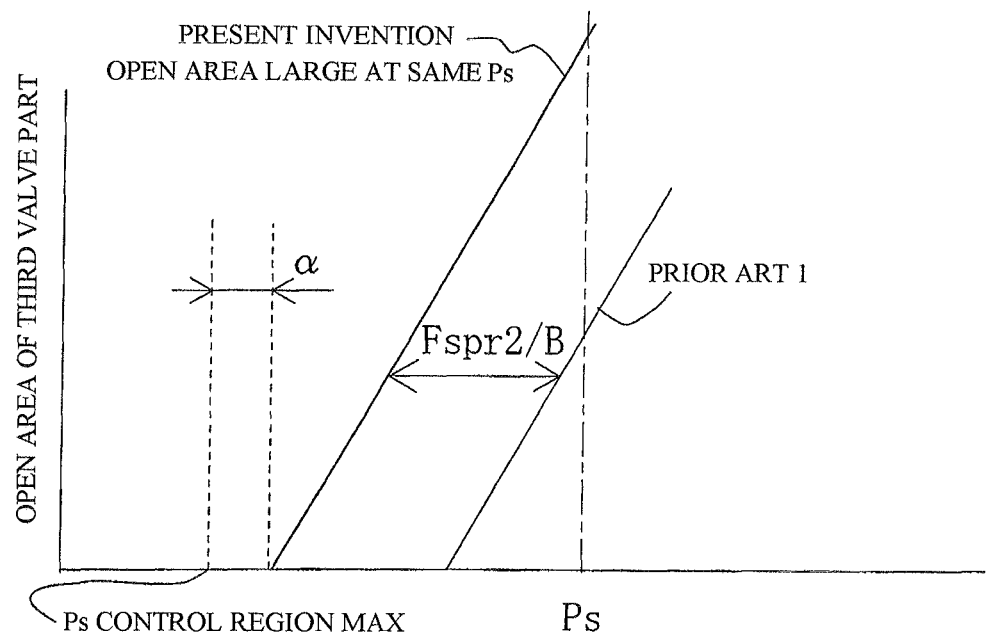
FIG. 4 is a view showing the state of the opening in the third valve part of the capacity control valve of the first embodiment.

FIG. 4 is a view showing the state of the opening in the third valve part.

In FIG. 4, the suction pressure Ps is indicated on the horizontal axis, the open area of the third valve part is indicated on the vertical axis, and the left side of the Ps control range MAX is the normal operating region.

When the liquid refrigerant or the like in the control chamber is drained and the control chamber pressure Pc reaches a predetermined level or below, the suction pressure Ps also gradually decreases, the bellows 51 extends, and the third valve part 43 is seated on the seat surface 53b of the adapter 53.

In this case, by providing the urging means 48 to the third valve part 43 in the present invention in contrast with Prior Art 1, the closing of the third valve part 43 can be delayed by Fspr2/B, and a longer drainage time for the liquid refrigerant can be maintained.

The spring force of the urging means 48 is set so that the third valve part is closed at a pressure a safe width a higher than the normal control region, so as to ensure that the control speed during normal control does not decrease.

As described above, the open area s2 of the third valve part 43 is larger than that of Prior Art 1 by the amount obtained through the valve-opening force Fspr2.

The operation will next be described in a case in which the swash plate variable-capacity compressor M provided with the capacity control valve V is applied in an automobile air conditioning system.

First, when the rotating shaft 20 is rotated by the rotational drive force of an engine via a transmission belt (not shown) and the driven pulley 24, the swash plate 21 rotates integrally with the rotating shaft 20. When the swash plate 21 rotates, the pistons 22 reciprocate in the cylinders 14 with a stroke that is in accordance with the inclination angle of the swash plate 21, and refrigerant gas taken into the cylinders 14 from the suction chamber 13 is compressed by the pistons 22 and discharged to the discharge chamber 11. The discharged refrigerant gas is fed to the evaporator 27 from the condenser 25 through the expansion valve 26 and returned to the suction chamber 13 as the refrigeration cycle is performed.

The discharge amount of refrigerant gas in this instance is determined by the stroke of the pistons 22, and the stroke of the pistons 22 is determined by the inclination angle of the swash plate 21 controlled by the pressure (control chamber pressure Pc) inside the control chamber 12.

During compression of the pistons 22, blow-by gas from the clearance between the pistons 22 and the cylinders 14 continuously flows toward the control chamber 12 and acts to increase the pressure Pc of the control chamber 12. However, since the fixed orifice 19 is provided, a certain amount of pressure is released to the suction chamber from the control chamber 12 even when the communicating passages (suction-side passages) 33, 44, 34 are closed, and the appropriate pressure can be maintained in the control chamber 12.

First, when the solenoid 60 is turned off and the variable-capacity compressor is left stopped for a long time in a state in which the second valve part 42 is blocking the communicating passages (suction-side passages) 34, 44, a state occurs in which liquid refrigerant is accumulated in the control chamber 12, the pressure becomes uniform inside the variable-capacity compressor, and the control chamber pressure Pc becomes significantly higher than the suction pressure Ps and the control chamber pressure Pc that occurs during driving of the variable-capacity compressor.

In this state, when the solenoid 60 is turned on and the valve body 40 begins to activate, the second valve part 42 moves in the valve-opening direction at the same time that the first valve part 41 moves in the valve-closing direction. The liquid refrigerant in the control chamber is drained immediately after this startup, but because the control chamber pressure Pc is at or above a predetermined level, the bellows 51 contracts, and a state occurs in which the adapter 53 disengages from the third valve part 43 and the second valve part 42 also opens to open the suction-side passages. The liquid refrigerant or the like accumulated in the control chamber 12 is drained to the suction chamber 13 through the communicating passages (suction-side passages) 44, 34. The suction pressure Ps and the control chamber pressure Pc also gradually decrease as the liquid refrigerant is drained.

When draining of the liquid refrigerant in the control chamber 12 is completed and the control chamber pressure Pc decreases to or below a predetermined level, the pressure-sensitive body 50 extends by elastic return, and the adapter 53 engages with the third valve part 43 to close the valve.

In this draining process, since providing the urging means 48 to the third valve part 43 increases the open area of the third valve part 43 and delays valve closure, the liquid refrigerant is adequately drained.

Then, in operation at the maximum discharge amount, the solenoid 60 (coil 68) is supplied with current at a predetermined current value (I), the movable iron core 66 and the driving rod 65 resist the urging force of the pressure-sensitive body 50 and the coil spring 67, and the valve body 40 moves to a position at which a state occurs in which the first valve part 41 is seated on the seat surface 35a to block the communicating passages (discharge-side passages) 31, 32, and the second valve part 42 is separated from the seat surface 36a to open the communicating passages (suction-side passages) 34, 44.

During normal control (between maximum-capacity operation and minimum-capacity operation), the amount of power supplied to the solenoid 60 (coil 67) is appropriately controlled to vary the electromagnetic driving force (urging force) thereof. Specifically, the position of the valve body 40 is appropriately adjusted by the electromagnetic driving force, and the opening amount of the first valve part 41 and the opening amount of the second valve part 42 are controlled to achieve the desired discharge amount. The third valve part 43 is closed in this state.

In the minimum-capacity operating state, power is withdrawn from the solenoid 60 (coil 68), the movable iron core 66 and the driving rod 65 retreat by the urging force of the coil spring 67 and stop in a rest position, and the valve body 40 moves to a position at which a state occurs in which the first valve part 41 separates from the seat surface 35a to open the communicating passages (discharge-side passages) 31, 32, and the second valve part 42 is seated on the seat surface 36a to block the communicating passages (suction-side passages) 34, 44. The discharge fluid (discharge pressure Pd) is thereby fed into the control chamber 12 through the communicating passages (discharge-side passages) 31, 32, 33. The inclination angle of the swash plate 21 is then controlled to the minimum value thereof, and the stroke of the pistons 22 is minimized. As a result, the discharge amount of refrigerant gas is minimized. The third valve part 43 is closed in this state.

As described above, during normal control, since the open area of the communicating passages (33, 44, 34) can be made about as small as that of the fixed orifice, and the communicating passages (33, 44, 34) can be blocked during minimum-capacity operation, it is possible to increase the swash plate control speed during normal control and minimum-capacity operation.

Second Embodiment

Figure 5:
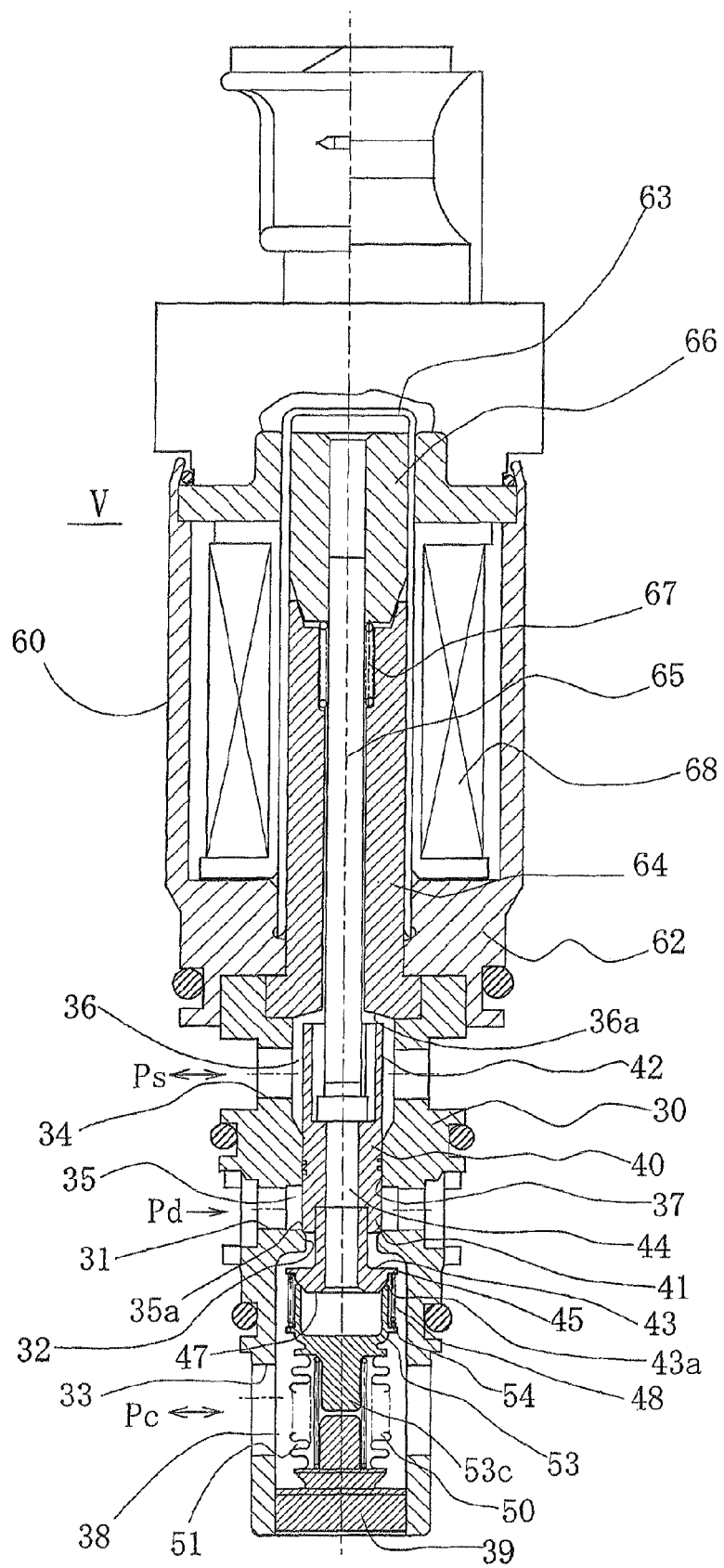
FIG. 5 is a sectional front view showing a second embodiment of the capacity control valve of the present invention.
Figure 6:
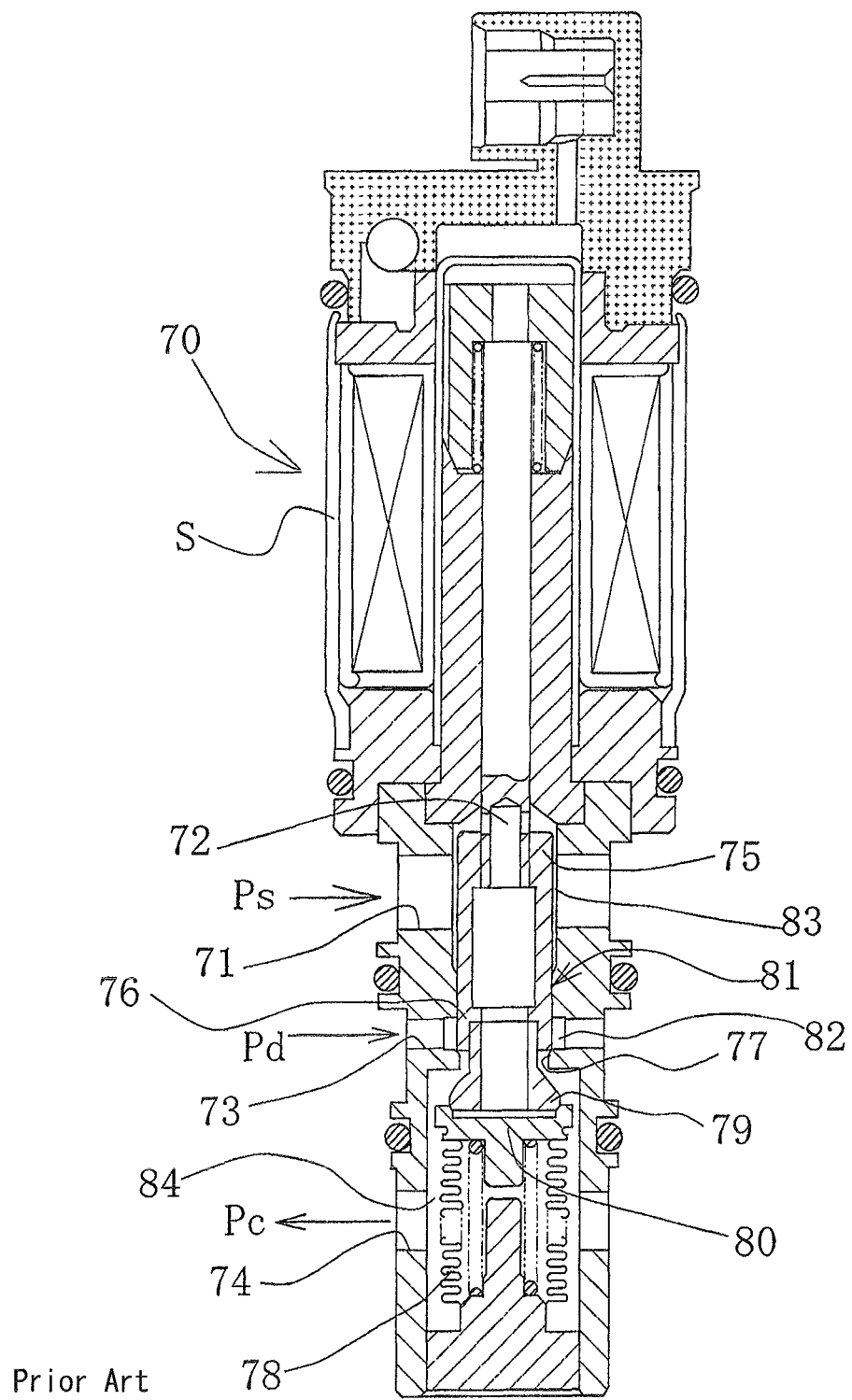
FIG. 6 is a sectional front view showing the capacity control valve of Prior Art 1.
Figure 7:
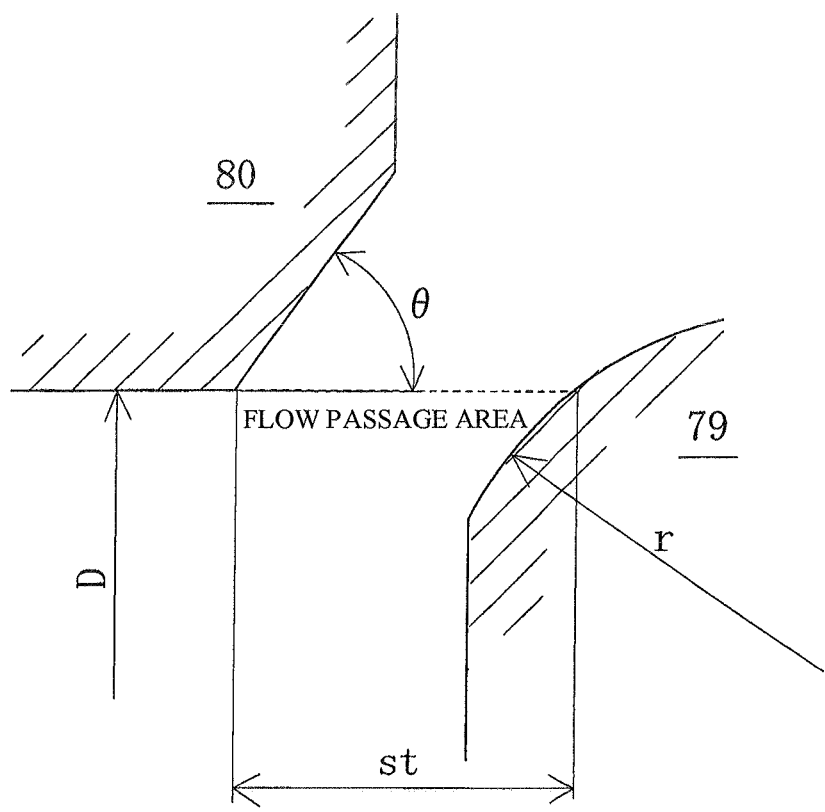
FIG. 7 is a view showing the factors that determine the flow passage area of the third valve part in Prior Art 1, and shows a state in which the view of FIG. 6 is rotated 90° clockwise.
Figure 8:
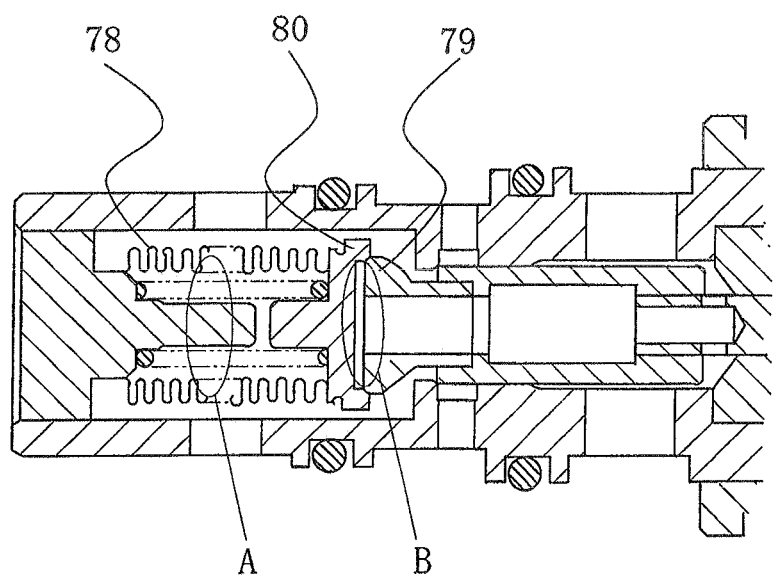
FIG. 8 is a view showing the seal diameter of the third valve part in Prior Art 1.
Figure 8:
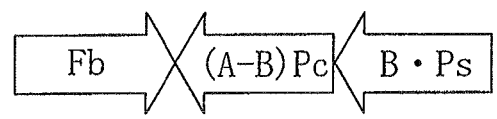
Figure 9:
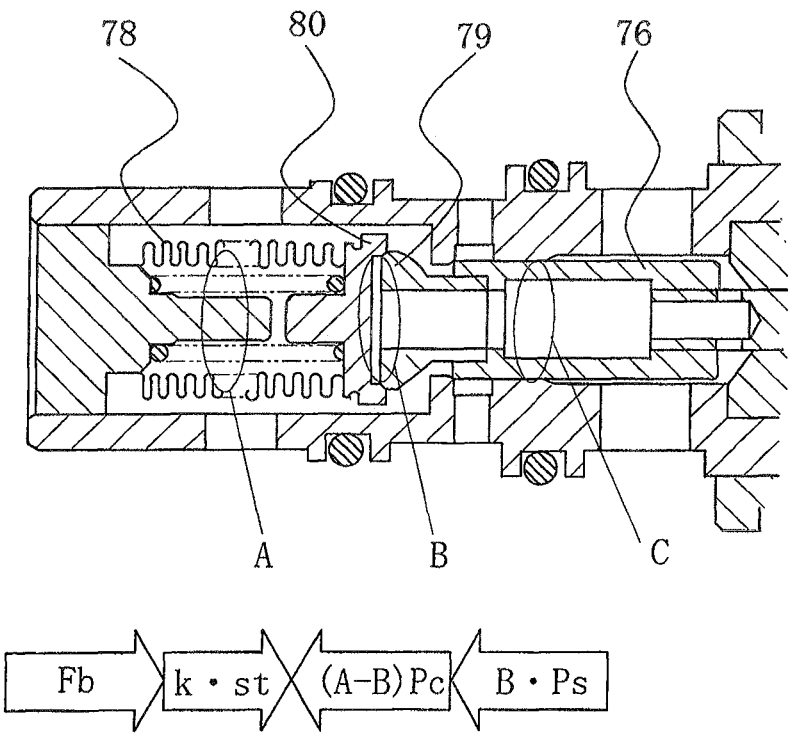
FIG. 9 is a view showing the stroke of the third valve part in Prior Art 1.
Figure 10:
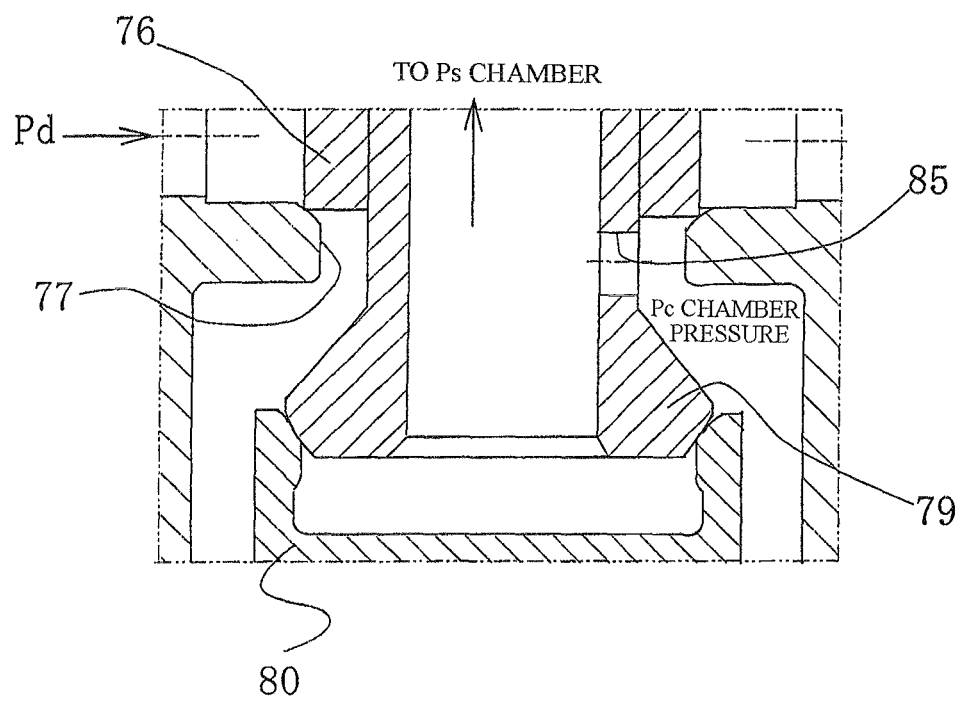
FIG. 10 is a sectional view showing the relevant parts of the capacity control valve of Prior Art 2.

FIG. 5 is a sectional front view showing a second embodiment of the capacity control valve of the present invention.

In FIG. 5, reference numerals that are the same as those in FIG. 2 refer to the same members, and no detailed description of such members is given hereinafter.

In the second embodiment, a flange 45 extending through the entire circumference is provided on an outside surface positioned closer to the solenoid 60 than the end surface 47 of the third valve part 43, and a flange 54 extending through the entire circumference is also provided in the adapter 53 on a basal outside surface of the hollow cylindrical part 53a. The urging means 48 is installed between the flange 45 of the third valve part 43 and the flange 54 of the adapter 53, along the external periphery of the hollow cylindrical part 53a of the adapter 53, and acts in the valve-opening direction of the third valve part 43 and the adapter 53. The urging means 48 comprises a coil spring or other spring means, and a plurality thereof is arranged at equal intervals in the circumferential direction. In this case as well, since the coil spring is positioned in the path of drainage of liquid refrigerant, the pitch of the coil is preferably set to a large value.

KEY TO SYMBOLS 10 casing
11 discharge chamber
12 control chamber (crankcase)
13 suction chamber
14 cylinders
15 communicating passage
16 communicating passage
17 communicating passage
18 communicating passage
19 fixed orifice
20 rotating shaft
21 swash plate
22 pistons
23 connecting members
24 driven pulley
25 condenser
26 expansion valve
27 evaporator
30 body
31, 32 communicating passages (discharge-side passages)
33 communicating passage (control chamber-side passage)
34 communicating passage (suction-side passage)
35 first valve chamber
35a seat surface
36 second valve chamber
36a seat surface
37 guide passage
38 third valve chamber
39 blocking member
40 valve body
41 first valve part
42 second valve part
43 third valve part
43a engaging surface
44 communicating passage
45 flange
47 end surface of third valve part
48 urging means
50 pressure-sensitive body
51 bellows
53 adapter
53a hollow cylindrical part
53b seat surface
53c base part
54 flange
60 solenoid
62 casing
63 sleeve
64 fixed iron core
65 driving rod
66 movable iron core
67 coil spring
68 excitation coil
M swash plate variable-capacity compressor
V capacity control valve
Pd discharge pressure
Ps suction pressure
Pc control chamber pressure
A bellows effective area
B seal area of the third valve part
C seal area of the first valve part Fb bellows spring force
Fsol solenoid thrust
Fspr1 valve-opening spring force of the coil spring installed in the solenoid
Fspr2 valve-opening spring force of the urging means provided to the third valve part

The invention claimed is:

1. A capacity control valve comprising, in combination:
a discharge-side passage for communicating a discharge chamber for discharging a fluid and a control chamber for controlling an amount of fluid discharged;
a first valve chamber formed partway in said discharge-side passage;
a suction-side passage for communicating said control chamber and a suction chamber for taking in the fluid;
a second valve chamber formed partway in said suction-side passage;
a valve body integrally having a first valve part for opening and closing said discharge-side passage in said first valve chamber and a second valve part for opening and closing said suction-side passage in said second valve chamber, the first valve part and second valve part alternately opening and closing with respect to each other by reciprocating;
a third valve chamber formed partway in said suction-side passage closer to said control chamber than said second valve chamber;
a pressure-sensitive body for exerting an urging force in the direction of opening said first valve part by extension of the pressure-sensitive body and contracting in conjunction with an increase in the surrounding pressure, the pressure-sensitive body being disposed in said third valve chamber;
an adapter provided to a free end of said pressure-sensitive body in the extension and contraction direction thereof and having an annular seat surface;
a third valve part having an annular engaging surface for moving integrally with said valve body in said third valve chamber and closing said suction-side passage by engaging with the seat surface of said adapter and opening said suction-side passage by disengaging with the seat surface of said adapter;
a solenoid for exerting an electromagnetic driving force on the valve body in the direction of closing of the first valve part; and
a spring for acting in the valve-opening direction between said adapter and the third valve part so that said third valve part increases an open area of said third valve part and delays valve closure,
wherein when the solenoid is turned off to be left in a state in which the second valve part blocks the suction-side passage, a state occurs in which the fluid is accumulated in the control chamber, and in this state, when the solenoid is turned on and the valve body begins to activate, a state occurs in which the adapter disengages from the third valve part and the second valve part also opens to open the suction-side passage, wherein fluid accumulated in the control chamber is drained to the suction chamber.

2. The capacity control valve according to claim 1, wherein the spring comprises a coil spring.

3. The capacity control valve according to claim 1, wherein the spring is disposed on an internal peripheral side of said adapter.

4. The capacity control valve according to claim 1, wherein the spring is disposed on an external peripheral side of said adapter.

5. The capacity control valve according to claim 2, wherein the spring is disposed on an internal peripheral side of said adapter.

6. The capacity control valve according to claim 2, wherein the spring is disposed on an external peripheral side of said adapter.

* * * * *